United States Patent
Kithil et al.

(10) Patent No.: US 7,516,645 B2
(45) Date of Patent: Apr. 14, 2009

(54) OMNI-DIRECTIONAL CRASH SENSOR

(75) Inventors: Philip W. Kithil, Santa Fe, NM (US);
James L. Novak, Albuquerque, NM (US); Daniel J. Du Rocher, Metamora, MI (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 11/808,382

(22) Filed: Jun. 8, 2007

(65) Prior Publication Data

US 2007/0277622 A1    Dec. 6, 2007

Related U.S. Application Data

(62) Division of application No. 10/902,000, filed on Jul. 30, 2004, now Pat. No. 7,475,587.

(51) Int. Cl.
*G01M 7/00* (2006.01)
(52) U.S. Cl. .......................... 73/12.09; 73/777
(58) Field of Classification Search ..... 73/12.01–12.09, 73/777
See application file for complete search history.

(56) References Cited

U.S. PATENT DOCUMENTS

| | | | |
|---|---|---|---|
| 4,036,057 A | 7/1977 | Morais | |
| 4,691,556 A * | 9/1987 | Mellander et al. | 73/12.01 |
| 5,126,980 A | 6/1992 | Sallas et al. | |
| 5,681,982 A * | 10/1997 | Stoll et al. | 73/12.13 |
| 5,852,793 A * | 12/1998 | Board et al. | 702/56 |
| 6,014,896 A | 1/2000 | Schoess | |
| 6,076,405 A | 6/2000 | Schoess | |
| 6,370,964 B1 | 4/2002 | Change et al. | |
| 6,510,738 B1 | 1/2003 | Lee et al. | |
| 6,784,792 B2 * | 8/2004 | Mattes et al. | 340/436 |
| 6,937,938 B2 * | 8/2005 | Sansone | 702/16 |
| 7,149,670 B2 | 12/2006 | Iwasaki et al. | |
| 7,304,566 B2 * | 12/2007 | Mae et al. | 340/436 |
| 2002/0112526 A1 | 8/2002 | Mattes | |

FOREIGN PATENT DOCUMENTS

| | | |
|---|---|---|
| DE | 197 45 309 A1 | 4/1999 |
| EP | 0 893 309 A | 6/1998 |
| EP | 0 978 425 A | 2/2000 |
| WO | WO 03/062780 | 7/2003 |

* cited by examiner

*Primary Examiner*—Max Noori
(74) *Attorney, Agent, or Firm*—Blank Rome LLP (57) ABSTRACT

A stress wave sensor comprising a piezoelectric film and means therein for connection to sensor electronics. The piezoelectric film preferably comprises polyvinylidene fluoride. Also a stress wave sensor system and methods employing one or more such stress wave sensors, preferably attached to a vehicle transparent component, most preferably to the vehicle windshield.

5 Claims, 5 Drawing Sheets

OMNI-DIRECTIONAL CRASH SENSOR

CROSS-REFERENCE TO RELATED APPLICATIONS

This application is a Divisional application of U.S. patent application Ser. No. 10/902,000, entitled "OMNI-DIRECTIONAL CRASH SENSOR," filed Jul. 30, 2004, which claims priority to PCT Application No. PCT/US03/01603, entitled "OMNI-DIRECTIONAL CRASH SENSOR," filed Jan. 16, 2003 which is expressly incorporated by reference herein.

TECHNICAL FIELD

The present invention relates to impact detection, particularly to crash detection for motor vehicles.

BACKGROUND OF THE INVENTION

Patent Cooperation Treaty ("PCT") Application No. US00/04765 and the art discussed therein relate to detecting forces applied to transparency products such as automotive glass. PCT US00/04765 discloses various sensors, including capacitive sensors, embedded in or adhered to glass products, which are sensitive to physical forces applied to the glass product. In a vehicle crash sensing and occupant protection system, multiple sensors are used to determine the origin of the impact and other useful characteristics of the crash, to optimize the occupant restraining devices.

It is known that most materials change shape or form when subjected to stress, and the change may be evidenced in the material by any of several mechanisms. One such mechanism is an acoustic wave ("AW") in which acoustic energy propagates through the material without affecting the integrity.

PCT US00/04765 discloses use of capacitive sensors, or other sensors such as strain gauges, embedded in laminated glass or adhered to glass, for the purpose of detecting vehicle crash characteristics. The present invention provides greatly improved sensors used for the cited purposes, means for determining parameters of the vehicle crash, application of the sensors on other vehicle structural components, and use of data from the spatially-distributed sensors to determine characteristics of frontal, side, rear, and other impacts as well as vehicle rollover conditions.

SUMMARY OF THE INVENTION

The present invention is of a stress wave sensor comprising a piezoelectric film and means therein for connection to sensor electronics. In the preferred embodiment, the piezoelectric film comprises polyvinylidene fluoride.

The invention is also of a stress wave sensor system comprising one or more stress wave sensors according to the preceding paragraph wherein one or more of the sensors are attached to a vehicle transparent component, preferably to the vehicle windshield.

The invention is further of an impact detection system comprising a plurality of stress wave sensors each comprising a piezoelectric film, the system optionally comprising one or more accelerometers, wherein each stress wave sensor is attached to a vehicle skin, structural, or transparent component, and preferably to a transparent component. In the preferred embodiment, each stress wave sensor comprises polyvinylidene fluoride.

The invention is additionally of a method of characterizing a vehicle crash condition by reference to output from a plurality of sensors each comprising a piezoelectric film, comprising: collecting output from the plurality of sensors and analyzing the following: one or both amplitude and rise time of each sensor's output; each sensor's output in a plurality of frequency bands, preferably from at least bands at approximately 1 kHz-2.5 kHz and 5 kHz-20 kHz; and time differentiated outputs' of the sensors. In the preferred embodiment, the piezoelectric film comprises 30 polyvinylidene fluoride, and optionally, the plurality of sensors are attached to a vehicle transparent component. The analyzing step can comprise estimating either or both of a vehicle crash origin point and a crash severity.

The present invention is yet further of a method of filtering crash events from non-crash events by comparing a response of one or more piezoelectric film sensors located on a transparent portion of a vehicle to a response of one or more piezoelectric film sensors not located on a transparency portion, optionally employing the steps of the preceding paragraph.

The present invention is additionally of a vehicle windshield comprising a crash sensing 10 system comprising one or more piezoelectric stress wave sensors positioned in or on the vehicle windshield.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

The present invention relates to sensors, systems, and methods for impact detection, particularly for motor vehicle crash detection. In one embodiment, the piezoelectric effects due to vehicle crash stresses propagated from the point of impact are detected by one or more polyvinylidene fluoride ("PVDF") sensors adhered to glass, preferably the motor vehicle windscreen.

PVDF sensors are piezoelectric sensors uniquely suited for the measurement of induced stresses ranging from bars to hundreds of kilo-bars. They are thin (less than 25 um), unobtrusive, self-powered, adaptable to complex contours, and available in a variety of configurations. PVDF thin-film piezoelectric polymer transducers may be employed over a wide range of stresses. PVDF gauges can measure transient pressures from Kpa to 40 Gpa. General information on PVDF sensors may be found at www.ktech.com/pvdf.htm.

Because the speed of sound in solid materials is much greater than the speed of sound in air, the acoustic waves generated by a crash arrive at the edge of the glass in a few microseconds after impact. Although the bonding material, which adheres the windshield to the vehicle, acts to dampen the waves, the energy content is sufficient to cross this barrier and propagate into the glass. Thus, PVDF sensors readily detect the spike from a crash event.

PCT US00/04765 proposed that multiple sets of electrodes, such as a set in each corner of the windshield, can discriminate a crash into a barrier versus a crash in which the oncoming vehicle is partially offset versus a crash into a tree or pole (see FIG. 6 in PCT US00/04765), The present invention provides for detecting any crash event from any direction. Accordingly, spatially separated PVDF sensors on the windshield are able to determine that a side impact or rear-end collision has occurred by operation of the geometric calculations shown below and depicted in FIGS. 2(a) and 2(b).

In one embodiment of the present invention, PVDF material is adhered to the glass and connected to amplifier electronics which amplifies and filters the signal generated by the PVDF material, as stress propagates into and across the windshield. The stress may be comprised of normal vibrations induced by road conditions, engine vibration, wind noise, etc. or may be comprised of much higher stress levels induced by a crash event in which exterior trim as well as structural elements of the vehicle undergo deformation and destruction. The latter stress is detected as a "spike" due to the much greater amount of energy released from the crash compared to the background stress levels from normal vehicle operation.

Figure 1:
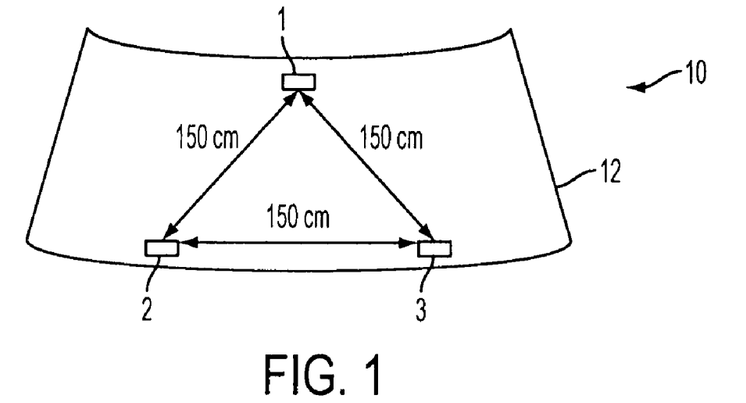
FIG. 1 is a diagram of use according to the invention of three PVDF sensors in triangular configuration on the windshield of a motor vehicle.

Multiple sets of PVDF materials adhered to several locations on the windshield provide the capability to differentiate the time between the spikes caused by the crash event. This "time of flight" of the stress propagation across the windshield can be used to reconstruct the geometric origin of the stress (crash origin). For example, assume three sensors 1, 2, 3 arranged uniformly on the windshield 12 as depicted in FIG. 1, such that:

Distance from lower left sensor to lower right sensor=150 cm.;

Distance from lower right sensor to upper center sensor=150 cm; and

Distance from upper center sensor to lower right sensor=150 cm.

Assuming that the time of arrival of the stress wave to a point at the edge of the glass is uniformly a function of distance from the point of impact to that point, and assuming that the speed of the stress wave across the glass is uniform, then geometric relationships govern the time of arrival of the stress wave at each sensor as well as the inter-sensor times of arrival, from which the origin point of the crash can be reconstructed.

Figure 2A:
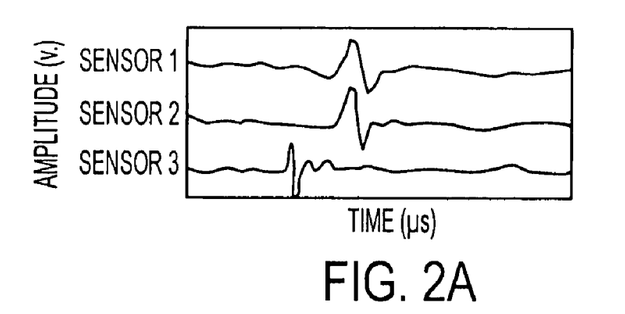
FIG. 2(a) is an example graph of sensor outputs for a crash of type c-3.
Figure 2B:
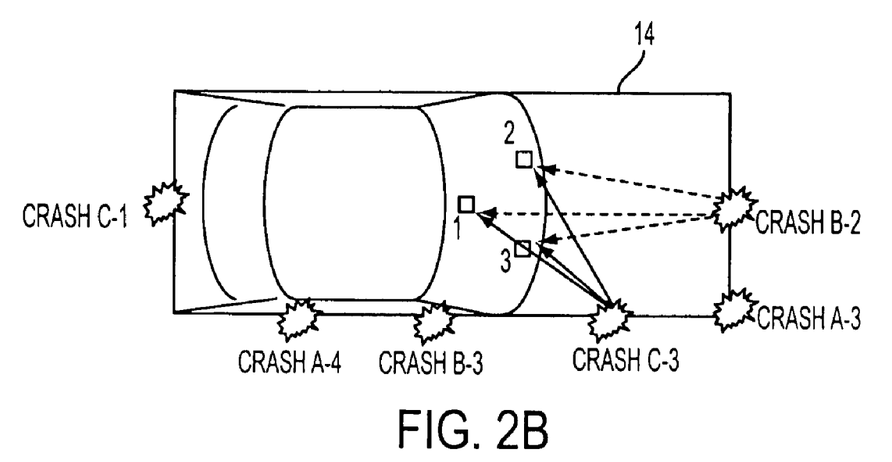
FIG. 2(b) illustrates sample crash points and their corresponding crash type according to a classification of the invention.

Given the 3-sensor configuration 10 shown in FIG. 1, time-of-arrival at each sensor 1, 2, 3 of the stress wave generated by a crash event, as depicted in FIGS. 2(a) and 2(b), falls within any of 13 possible combinations:

Group A: the time of arrival at each sensor is different:
a-1 Sensor 1, then sensor 2, then sensor 3
a-2 Sensor 2, then sensor 1, then sensor 3
a-3 Sensor 3, then sensor 2, then sensor 1
a-4 Sensor 1, then sensor 3, then sensor 2
a-5 Sensor 2, then sensor 3, then sensor 1
a-6 Sensor 3, then sensor 1, then sensor 2

Group B: the time of arrival at any two sensors are equal and precede the time of arrival at the 3rd sensor:
b-1 Sensor 1 and sensor 2, then sensor 3
b-2 Sensor 2 and sensor 3, then sensor 1
b-3 Sensor 1 and sensor 3, then sensor 2

Group C: the time of arrival at one sensor precedes the time of arrival at the other two sensors which are equal:
c-1 Sensor 1, then sensor 2 and sensor 3
c-2 Sensor 2, then sensor 1 and sensor 3
c-3 Sensor 3, then sensor 2 and sensor 1

Group D: the time of arrival at all three sensors is equal:
d-1 Sensor 1 equals sensor 2 equals sensor 3

Within Group A, the arrival times of the three sensors can be used to calculate the effective focal point of the crash with respect to vehicle 14, as depicted in FIGS. 2(a) and 2(b). Groups B and Group C would use similar calculations. Any ambiguity resulting from the simultaneous times of arrival on two of the three sensors could be resolved using the information from the third sensor.

Figure 5:
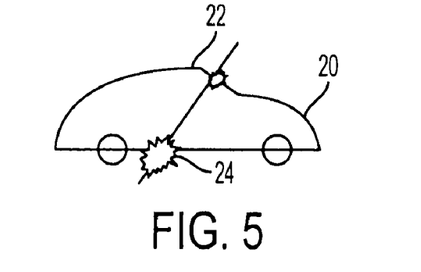
FIG. 5 illustrates two possible impact points for a crash of type d.

In Group D, the impact focal point (simultaneous arrival times on all 3 sensors) must be either at the center of the triangle formed by the three sensors (i.e., on the windshield itself) or at a point at the apex of a pyramid whose axis is normal to the windshield. The only vehicle 20 peripheral point that coincides with this apex is under the center 24 of the vehicle, as shown in FIG. 5. This point is not a likely crash event focal point and is characterized as an impact to the centermost point 22 of the windshield, equidistant from the 3 sensors.

Crash severity is defined as the change in acceleration over time. A more severe crash such as impacting a solid wall at 30 mph requires a restraint system to deploy much more rapidly than a less severe crash such as the same type of impact at 10 mph.

Figure 3A:
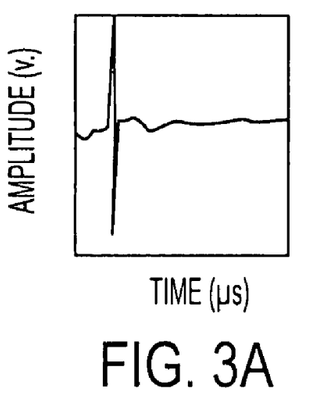
FIGS. 3(a) and (b) are graphs showing sensor output for high severity crashes and lower severity crashes.
Figure 3B:
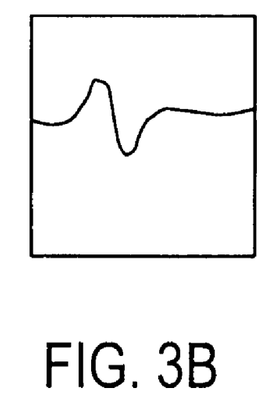

In addition to arrival times, more information is available in the acoustic waves detected by the three sensors. Crash severity can be further characterized by reference to the amplitudes and rise times of the acoustic waves detected by the three sensors. Sample plots of different amplitudes and rise times are depicted in FIG. 3. A more severe crash is characterized by greater amplitudes and faster rise times. From this it is possible to differentiate the amplitudes/rise times at each sensor and gain even more information about the crash.

Figure 4A:
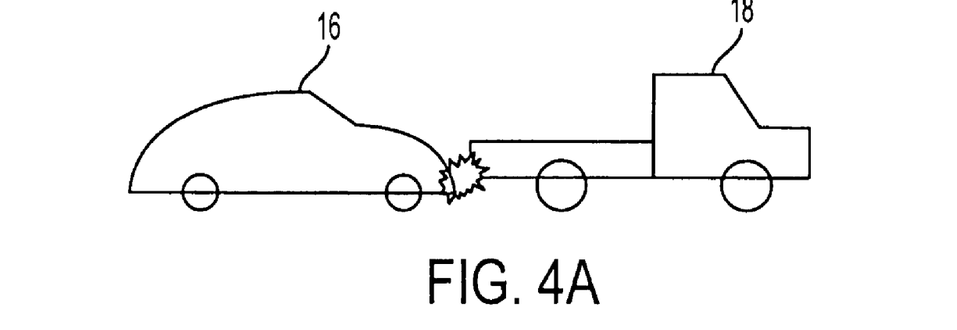
FIG. 4(a) illustrates a rear-impact crash in which the rear car has a substantially lower bumper height.
Figure 4B:
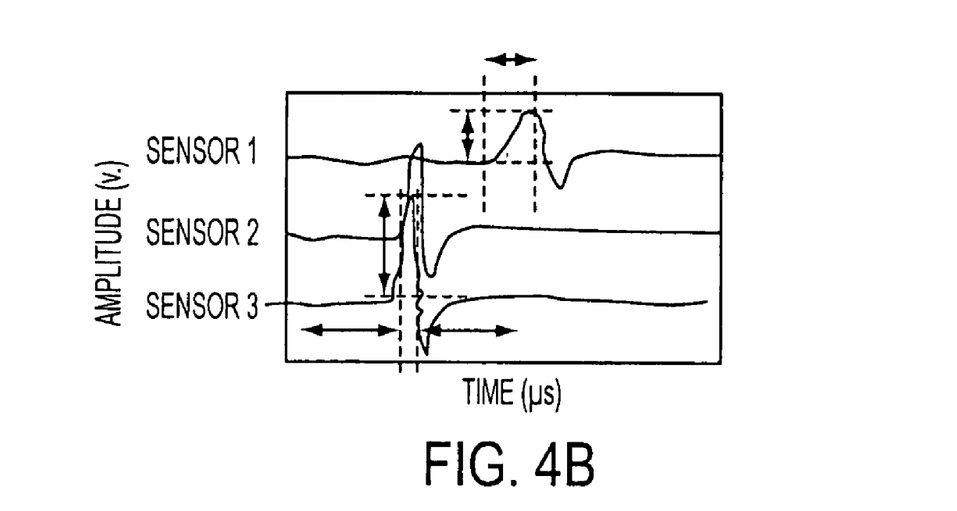
FIG. 4(b) is a graph of sensor outputs for a crash of the type of FIG. 4(a)

For example, FIGS. 4(a) and 4(b) depict a vehicle-to-vehicle crash in which the "bullet" vehicle 18 under-rides the "target" vehicle 18. This is a common type of rear-end crash involving a smaller vehicle (passenger car) hitting a larger vehicle (SUV or truck). The rear bumper height of the larger vehicle is not matched to the front bumper height of the passenger car and thus the front of the smaller vehicle goes underneath the back of the larger vehicle.

First, the crash focal point analysis would characterize this as a full-frontal impact because the stress wave arrival time at sensors 2 and 3 would be virtually identical, followed by arrival time at sensor 1 (FIG. 4(*b*)).

Additionally, the amplitude and rise time of the signals at sensors 2 and 3 would be smaller than the value obtained if the same car hit a solid wall. This is attributable to the reduced energy in the under ride crash vs. the solid wall crash. Sensor 1 signals likewise will exhibit a reduced amplitude and rise time.

It Is feasible to detect and characterize a variety of roll-over crash conditions. Assume a vehicle skids and hits a curb simultaneously with left-side front and back tires, which causes the vehicle to "trip" onto its left side. Under the current invention, pre-impact signals from the array of sensors would demonstrate normal road and vehicle acoustic levels, followed by the front and rear tire impacts causing spikes whose origin is calculated at the lower edge of the vehicle left side (tires), followed by numerous spikes generated as the left side of the vehicle slides along the roadway or median. The sensed acoustic waves may also contain signals generated by the deflection of the glass itself as the vehicle undergoes torsional strain during the rollover.

A second example could be a similar but higher-speed rollover, in which the vehicle trips then becomes airborne before landing either on its side, roof, or some combined surface impact. While airborne, the spikes presumably would diminish or disappear entirely until the vehicle landed. Of course, at some point in this type of catastrophic crash the windshield likely would fracture, reducing the accuracy of the crash analysis algorithms.

One skilled in the art can appreciate that large numbers of different crash events can be characterized by reference to the time of arrival, amplitude, and rise time of signals detected by the sensors of the present invention.

The invention is applicable to equivalent constructions, methodologies, and applications, including the following:

1. Use of sensing materials other than PVDF;
2. Application of the sensor to one or more vehicle parts or components other than glass;
3. Application of the sensing system to detect non-crash events or events occurring outside of a vehicle environment;
4. Use of any number of sensors in or on the glass;
5. Use of sensors in or on glass and on other non-glass vehicle parts;
6. Use of other mathematical and/or geometric formulae to characterize the crash origin and/or crash severity; and
7. Application of the sensing system to detect rain for the purpose of automatically controlling the wiper system.

The present invention is additionally of various constructions of the PVDF sensor, methods for filtering incidental events such as a rock hitting the windshield versus a crash event, means of periodically monitoring the functionality of the PVDF sensors, a method for crash analysis, and a sensing system comprised of one or more PVDF sensors and a centrally-located accelerometer.

Figure 6A:
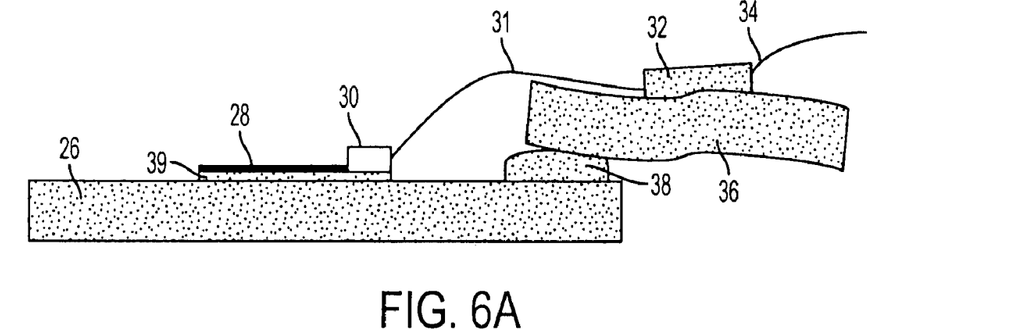
FIG. 6(a) illustrates preferred mounting of PVDF sensors and electronic connection away from the windshield.
Figure 6B:
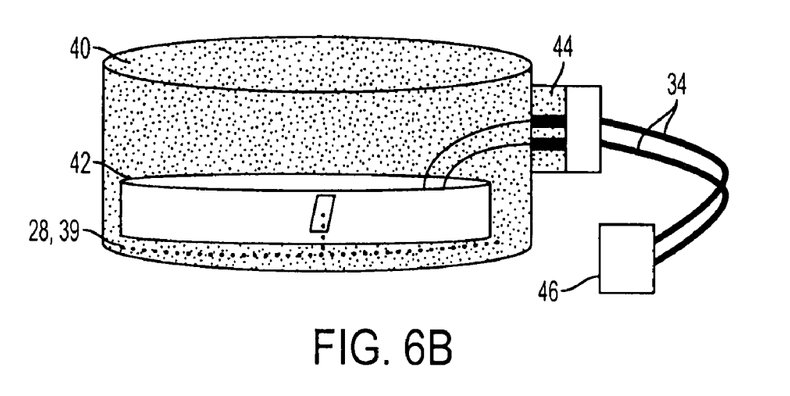
FIG. 6(b) illustrates sensor mounting as particularly useful for replacement windshields.

The PVDF sensing film is preferably applied (e.g., by bonding agent or tape 39) to the inner windshield surface 26. FIGS. 6(*a*) and 6(*b*) show various designs to connect the sensing film to amplifier and filtering electronics and to the central airbag controller or to a dedicated microprocessor 46 for analysis of the signals.

FIG. 6(*a*) shows a design in which the sensor amplifier electronics 32 is permanently attached to the vehicle, for example on the "A" pillar 36 adjacent the front windshield and adhered thereto (such as by glass mounting adhesive 38 (e.g., urethane)). Wires 31 and/or other communication means (e.g., connector 30) connect these electronics to the sensor film 28 and convey signals 10 generated within the PVDF film, due to the propagation of surface acoustic waves across the glass. Power/data/ground wires 34 connect the electronics to external devices. This design reduces cost of installation of a replacement windshield, as the sensor electronics is contained within the vehicle and will not require replacement.

FIG. 6(*b*) shows a design in which the electronics is contained within a molded structure 40 that is filled with a potting compound. The PVDF film 28 is on the bottom of the molded structure, adjacent to the glass or other vehicle component to which the sensor is adhered. The electronics 42 is contained within the molded structure and is surrounded by a potting compound for protection. A suitable connector 44 is molded-in to the structure or "pigtail" conductors extend to a connector, which allows communication of signals from the sensor electronics to a microprocessor 46 or other signal analysis device. A double-sided adhesive bonding material 39 may be applied to the PVDF to allow simple application of the assembly to the glass, or optionally an adhesive material such as epoxy may be used to attach the PVDF film to the vehicle glass or other component.

Figure 7A:
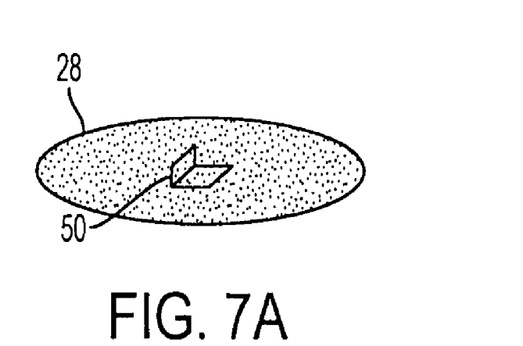
FIGS. 7(a)-(c) illustrate three possible tabbings of PVDF useful in the invention.
Figure 7B:
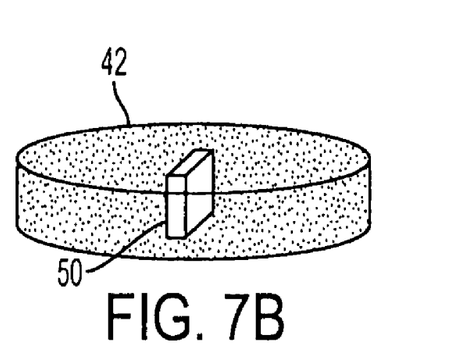
Figure 7C:
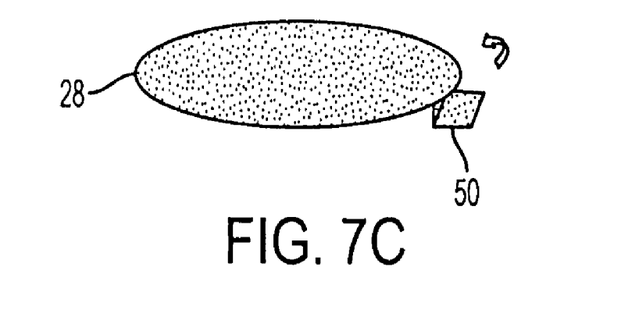

As seen in FIG. 7, the PVDF film 28 may have a tab 50 formed within (FIG. 7(*a*)) or on one edge (FIG. 7(*c*)). The tab is preferably folded such that it is normal to the plane of the PVDF film, oriented into the molded structure. The tab provides for a connection point between the PVDF film and the sensor electronics. The connection may utilize low temperature solder to connect wires to the tab, or may utilize a crimping connector. If the tab is formed within the PVDF, when folded normal to the plane of the PVDF, the tab may penetrate through a slot 52 formed in the sensor electronics circuit board 42 (see FIG. 7(*b*)), thereby allowing a simple means of connecting the PVDF film to the sensor electronics.

Figures 8A, 8B:
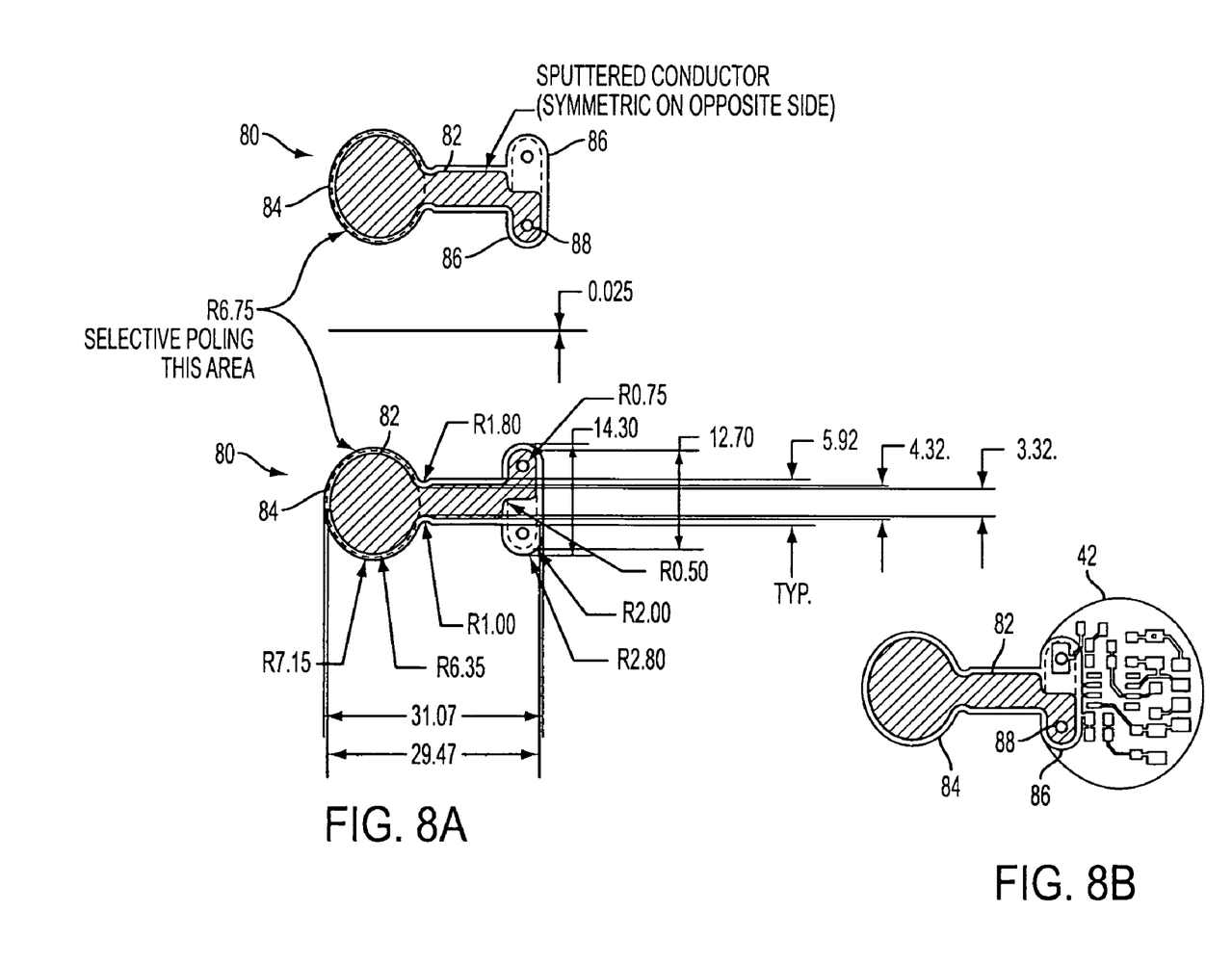
FIG. 8(a) illustrates a preferred embodiment of the invention that includes selective sputtering.
FIG. 8(b) illustrates the embodiment described in FIG. 8(a) connected to sensor electronics.

FIGS. 8(*a*) and (*b*) describe the sensor 80 with a "pollywog" PVDF shape. The pollywog shaped sensor 80 includes tabs 86 to allow crimp-thru connections to the sensor electronics. The tabs 86 are sputtered with conductive material 82 on opposite sides of the sensor 80 to allow crimp-thru connection that avoid a grounding contact of the active sensor side. Also, on one side of the sensor 80, an edge 84 is masked to allow the die-cutting process to not push sputtered conductive material onto the edge 84, causing inadvertent contact between a ground side and the active sensor side.

There is selective poling of the PVDF film 28 to maintain consistency in the active sensor side area. The sensor 80 is attachable to sensor electronics via slots 88 in the tabs 86 (FIG. 8(*b*)). The circuit board 42 includes flexible material to enhance conforming to curved surfaces like the windshield or other vehicle components.

In the design of FIG. 6(*b*), a replacement windshield (not shown) will have the molded structure containing the PVDF film, sensor electronics, and molded-in connector or "pigtail" wires pre-positioned on the glass. One or more such molded structures containing the PVDF film, electronics, and connector may be pre-positioned on the glass. Installation of the replacement glass is simplified as the technician merely re-connects the new sensor(s) which are pre-installed on the glass, to the crash sensing and occupant restraint system provided in the vehicle.

A system of PVDF sensors may include a PVDF reference sensor mounted on a centrally located chassis member (not shown). The reference will discriminate a rock hitting the windshield, as shock waves will predominately effect the glass-mounted PVDF sensors and have very little effect on the reference PVDF sensor.

A method of monitoring the functionality of a PVDF sensor preferably includes a means of communicating a signal to the PVDF film and detecting a response. If the response falls within an expected set of values, logic circuit or software indicates the PVDF film is functional, otherwise the logic circuit indicates a non-functional condition and a telltale light or other notification is provided to the vehicle operator. The signal may be communicated electronically or mechanically by providing a very small but known force to the glass. Alternatively, the vibration induced by operation of the vehicle engine, or by movement of the vehicle, may be detected by the sensors to indicate their functionality.

A crash sensing system preferably incorporates one or more PVDF sensors, preferably mounted on a vehicle transparency product such as the windshield, and a vehicle accelerometer. In many crash events the vehicle change in velocity cumulates over many tens of milliseconds due to the energy absorption by deformable vehicle structures adjacent to the point of impact. Yet, the occupant restraint devices may need to be triggered before the change in velocity is fully characterized by the centrally-located accelerometer. Crash energy data detected by the PVDF sensor(s) can be analyzed in the initial few milliseconds and combined with analysis of the accelerometer data, to provide improved crash recognition and crash severity analysis, thereby allowing more timely triggering and selection of the most appropriate occupant restraints.

An example of the current art of using a vehicle accelerometer for crash detection, analysis, and safety restraint system deployment, is seen in U.S. Pat. No. 6,272,412, to Wu et al ("Wu"). Unlike the present invention, Wu employs an accelerometer located in the midsection of the vehicle to detect various acceleration-generated waveforms. The waveforms are filtered to separate those under 100 Hz from those above 100 Hz. (Though Wu proposes that the above-100 Hz band have elastic wave properties whereas the under-100 Hz band have inelastic band properties, FIG. 4 of Wu depicts a waveform for an 8 mph impact with the higher frequency waveform arriving at the sensor at around 34 ms. Assuming the distance from front bumper impact point to the centrally located accelerometer is 8 feet, this corresponds to a transmission velocity of 235 ft/sec., considerably slower than the speed of sound in air (1,100 ft/sec.). It is well known that elastic waves propagate at a velocity of over 5,000 m/s in solids. See U.S. Pat. No. 4,346,914, to Livers et al., and U.S. Pat. No. 4,842,301, to Feldmaier.

Wu then analyzes the higher band for waveform arrival time and wave shape which characteristics are then used to determine crash mode and crash location. The lower band is integrated to provide change in velocity to then assess crash severity. The crash mode and location analysis is used to adjust the severity threshold to trigger deployment of the restraints.

Because PVDF sensors possess very high bandwidth, they record vibrations or acoustic waves at frequencies not possible with accelerometers. This wide bandwidth contains information about many more modes of vibration that the windshield exhibits during crash and non-crash events. These modes may be excited differently depending on the crash severity, direction, or other non-crash event, such as a rock hitting the windshield. A variety of signal processing techniques may be used to separate the vibrational mode signals from the composite signal, including the frequency spectrum method preferred here. Once the mode signals are separated, characteristics and differences between mode signals will allow determination of event conditions. These techniques include time delay measurements, correlations, and interpeak delays.

The present invention differs from Wu in at least the following respects: 1) the sensor is a piezoelectric film which is responsive to wave transmission by means of transient molecular changes in the film, rather than the accelerometer's responsiveness to positional change of a suspended mass; 2) the sensor is located on the vehicle windshield rather than on a structural member of the vehicle; 3) the modes of vibration detected by the piezoelectric film are separated according to mode of vibration, namely transverse vs. longitudinal, rather than an arbitrary lower frequency threshold; and 4) the analysis compares the waves according to the different modes of vibration, namely transverse vs. longitudinal, rather than Wu's method of characterizing the above-100 Hz waveforms by arrival time and wave shape, and integrating the under-100 Hz waveform to derive change in velocity.

The invention preferably employs a method for crash detection and discrimination which utilizes several frequency bands detected by the PVDF sensor. PVDF sensors attached to a vehicle windshield detect crash frequencies in the 1 kHz-2.5 kHz band (LF) and in the 5 kHz-20 kHz band (HF). The LF bands are similar for all sensors located on the windshield, whereas the HF bands will shift according to sensor location and sensor proximity to the crash origin. Other lower or higher 20 frequencies are generated by the crash and could provide additional information, however the cited frequencies are convenient to detect and analyze within the limited time available between the crash event and the required time-to-fire of the restraint systems. In one method, by reference to the sequence and relative timing of the initial peaks of the LF and HF bands, as well as to the relative amplitudes, it is possible to characterize the crash origin and crash severity, and to discriminate whether the impact is to a vehicle structure or surface component, or to the windshield glass.

This invention is comprised of equivalent constructions, methodologies, and processes, including but not limited to:

Use of piezoelectric material other than PVDF, such as co-polymers as described in the Technical Manual of Measurement Specialties, Inc. which can be reviewed at www.msiusa.com;

Use of LF and HF frequency bands other than described herein;

Use of one, two, or more than two frequency bands;

Employing PVDF or equivalent piezoelectric film laminated into the windshield rather than applied to the inner surface;

Attaching the PVDF or equivalent piezoelectric film to the circuit board by other means than described herein; and Employing methods of waveform analysis other than frequency spectrum analysis, to such as wavelets or other methods.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of characterizing a vehicle crash condition by reference to output from a plurality of sensors each comprising a piezoelectric film, the method comprising the steps of collecting output from the plurality of sensors; and analyzing one or more of the group consisting of: one or both of amplitude and rise time of each sensor's output; each sensor's output in a plurality of frequency bands, preferably from at least bands at about 1 kHz-2.5 kHz and 5 kHz-20 kHz; and time differentiated outputs of the sensors.

2. The method of claim 1, wherein the piezoelectric film comprises polyvinylidene fluoride.

3. The method of claim 1, wherein the analyzing step comprises estimating either or both of a vehicle crash origin point and a crash severity.

4. The method of claim 1, wherein the plurality of frequency bands include at least the ranges 1 kHz to 2.5 kHz and 5 kHz to 20 kHz; and time differentiated outputs of the sensors.

5. The method of claim 2, wherein the plurality of sensors are attached to a vehicle transparent component.

* * * * *